(12) United States Patent
Chretien et al.

(10) Patent No.: US 12,012,839 B2
(45) Date of Patent: Jun. 18, 2024

(54) REAL-TIME DECISION ENGINE

(71) Applicant: Halliburton Energy Services, Inc., Houston, TX (US)

(72) Inventors: Alexander Simon Chretien, Duncan, OK (US); Timothy Holiman Hunter, Duncan, OK (US); Stanley V. Stephenson, Duncan, OK (US); Mark A. Adams, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 410 days.

(21) Appl. No.: 17/285,980

(22) PCT Filed: Dec. 27, 2018

(86) PCT No.: PCT/US2018/067685
§ 371 (c)(1),
(2) Date: Apr. 16, 2021

(87) PCT Pub. No.: WO2020/139345
PCT Pub. Date: Jul. 2, 2020

(65) Prior Publication Data
US 2021/0381360 A1 Dec. 9, 2021

(51) Int. Cl.
*E21B 44/00* (2006.01)
*G05B 19/18* (2006.01)
(Continued)

(52) U.S. Cl.
CPC ............ *E21B 44/00* (2013.01); *G05B 19/182* (2013.01); *G05B 19/401* (2013.01); *G05B 19/41* (2013.01);
(Continued)

(58) Field of Classification Search
CPC .... G05B 19/401; G05B 19/416; G05B 19/41; G05B 19/0426; G05B 19/182;
(Continued)

(56) References Cited

U.S. PATENT DOCUMENTS

| 10,253,599 B2 * | 4/2019 | Dykstra .................. E21B 41/00 |
| 10,570,704 B2 | 2/2020 | Colvin et al. |

(Continued)

FOREIGN PATENT DOCUMENTS

| WO | 2016186646 A1 | 11/2016 |
| WO | 2018125176 | 7/2018 |

OTHER PUBLICATIONS

Canadian Office Action for Application No. 3115212 dated Nov. 3, 2022.

(Continued)

*Primary Examiner* — An H Do
(74) *Attorney, Agent, or Firm* — John W. Wustenberg; C. Tumey Law Group PLLC

(57) ABSTRACT

A method of performing a wellbore operation may include providing a real-time treatment decision engine, equipment centric decision engine, and equipment controls. The equipment centric decision engine may be configured to interface with the real-time treatment decision engine and the equipment controls. The equipment centric decision may include an operational database comprising wellbore servicing equipment models. The method may further include providing wellbore servicing equipment. The wellbore servicing equipment may be operable to be controlled by the equipment controls. The method may further include sending a command from the real-time treatment decision engine to the equipment centric decision engine. The method may further include evaluating the command using the wellbore servicing equipment models. The method may further (Continued)

include selecting equipment to carry out the command based at least in part on the wellbore servicing equipment models. The method may further include sending a control signal to the equipment controls.

18 Claims, 1 Drawing Sheet

(51) Int. Cl.
  *G05B 19/401* (2006.01)
  *G05B 19/41* (2006.01)
  *G05B 19/416* (2006.01)
(52) U.S. Cl.
  CPC ........ *G05B 19/416* (2013.01); *E21B 2200/20* (2020.05); *E21B 2200/22* (2020.05); *G05B 2219/45129* (2013.01)
(58) Field of Classification Search
  CPC ...... G05B 2219/45129; G05B 23/0283; G06N 3/02; E21B 44/00; E21B 2200/20; E21B 2200/22
  See application file for complete search history.

(56) References Cited

U.S. PATENT DOCUMENTS

| | | |
|---|---|---|
| 11,236,610 B2 * | 2/2022 | Kleinguetl .............. E21B 49/08 |
| 2005/0284661 A1 | 12/2005 | Goldman et al. |
| 2011/0060572 A1 | 10/2011 | Brown et al. |
| 2014/0326449 A1 | 11/2014 | Samuel et al. |
| 2016/0161933 A1 | 6/2016 | Chok et al. |
| 2018/0171769 A1 | 6/2018 | Gu et al. |
| 2018/0231987 A1 | 8/2018 | Florence et al. |
| 2018/0347281 A1 | 12/2018 | Duplantis et al. |

OTHER PUBLICATIONS

ISRWO International Search Report and Written Opinion for PCT/US2018/067685 dated Sep. 24, 2019.

* cited by examiner

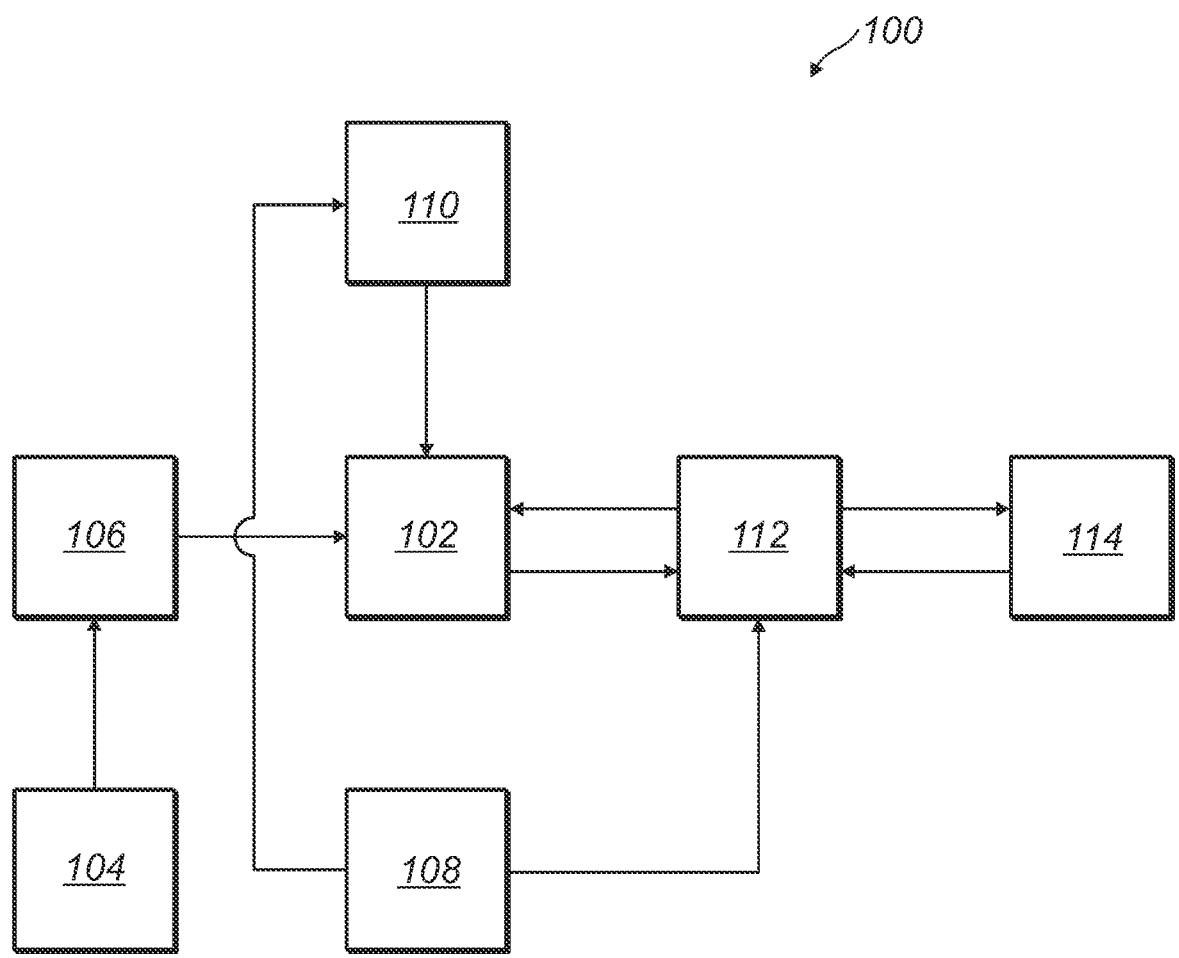

REAL-TIME DECISION ENGINE

BACKGROUND

A wellbore servicing operation may include the drilling of a wellbore into a subterranean formation, a drilling fluid, also referred to as a drilling mud, may be continuously circulated from the surface down to the bottom of the wellbore being drilled and back to the surface again. Drilling muds may be prepared at the surface using preparation equipment and circulated using pumps. Among other functions, the drilling fluid may serve to transport wellbore cuttings up to the surface, cool the drill bit, and provide hydrostatic pressure on the walls of the drilled wellbore.

Another wellbore servicing operation may include a cementing operation. During cementing operations such as well construction and remedial cementing, cement compositions are commonly utilized. Cement compositions may be used in primary cementing operations whereby pipe strings, such as casing and liners, are cemented in wellbores. In a typical primary cementing operation, a cement composition may be mixed using mixing equipment and pumped using pumping equipment into an annulus between the exterior surface of the pipe string disposed therein and the walls of the wellbore (or a larger conduit in the wellbore). The cement composition may set in the annular space, thereby forming an annular sheath of hardened, substantially impermeable material (i.e., a cement sheath) that may support and position the pipe string in the wellbore and may bond the exterior surface of the pipe string to the wellbore walls (or the larger conduit). Among other things, the cement sheath surrounding the pipe string should function to prevent the migration of fluids in the annulus, as well as protect the pipe string from corrosion. Cement compositions also may be used in remedial cementing methods, such as in squeeze cementing for sealing voids in a pipe string, cement sheath, gravel pack, subterranean formation, and the like. Cement compositions may also be used in surface applications, for example, construction cementing.

Another wellbore servicing operation may include fracturing. Fracturing treatments are commonly used in subterranean operations, among other purposes, to stimulate the production of desired fluids (e.g., oil, gas, water, etc.) from a subterranean formation. For example, hydraulic fracturing treatments generally involve pumping a treatment fluid (e.g., a fracturing fluid) into a well bore that penetrates a subterranean formation at a sufficient hydraulic pressure to create or enhance one or more fractures in the subterranean formation. The creation and/or enhancement of these fractures may enhance the production of fluids from the subterranean formation.

One challenge in the wellbore servicing industry may be personnel turnover and associated loss of qualified operators. Wellbore servicing may include a series of complex operations which may take many years for an operator to fully understand and become proficient in. As such, oftentimes junior to middle ranking operators are not fully aware of how to best utilize the wellbore servicing equipment. Furthermore, there may be regional variations in how operators are trained to operate equipment which may cause significant variations in job delivery.

During the planning and design stage of wellbore treatments, certain assumptions may be made based on characteristics of wells in the same field or formation as well as data and measurements gathered from seismic and other geological tests. The assumptions and measurements may determine how a pump schedule or treatment plan is developed. However, during a wellbore treatment, the well response to treatment may be different than the predicted response. The actual well response to treatment may vary due to variances in formation characteristics and other individual well conditions. The unknown well parameters are generally only revealed during actual formation treatment and may cause the treatment plan to be modified on-the-fly to accommodate the well conditions. One parameter that may be adjusted on the fly is treatment rate which may be designed based on well and formation characteristics to achieve a target pressure. However, due to well response encountered during treatment, treatment rate is often modified during treatment to achieve a desired treating pressure. The modifications are typically handled by a human operator observing the well response based on a limited number of parameters which are then subjectively considered and treatment parameters are adjusted. However these adjustments may not take into consideration the effects on wellbore equipment such as capability of the wellbore equipment to handle the adjusted treatment rate.

In an embodiment a well treatment control system is provided that may control wellbore equipment based on actual well response in real time. The well treatment control system may selectively take action based on a desired set of selectable hierarchy of optimization parameters. The well treatment control system may include a real-time treatment decision engine, an equipment-centric decision engine, equipment controls, a treatment planning function, an optimization selection and priority module, and a well monitoring system.

BRIEF DESCRIPTION OF THE DRAWINGS

These drawings illustrate certain aspects of the present disclosure, and should not be used to limit or define the disclosure.

The FIGURE illustrates a well treatment control system.

DETAILED DESCRIPTION

Selection of operating conditions of wellbore servicing equipment may be an important component of achieving successful and profitable results in the wellbore servicing industry. As discussed above, as a wellbore treatment is performed, the operating parameters may be adjusted to achieve a particular optimization objective. In one example a treatment rate may be adjusted to provide a target pressure to the formation. The treatment rate may be adjusted in many different ways, such as by ramping only one pump up or down or ramping a combination of pumps up or down, for example. The selection of exactly which pump(s) operation should be adjusted may be based on operator experience. However, an operator is not able to, in real time, see all well site parameters such as individual engine RPM, transmission gear, and hydraulic horsepower output of the pump, for example. These and other well site parameters may affect which pumps are able to handle the modified treatment rate and therefore should be selected to handle the modified treatment rate. In addition to well site parameters associates with equipment, there may be many other external factors that may affect how a change in treatment should be optimally handled. There may be many external factors such as, for example, business objectives, efficiency objectives, economic objectives, risk objectives, production objectives, and emissions objectives, among others. A well treatment control system is provided, the well treatment control system including a real-time treatment decision engine, an equipment-centric decision engine, equipment controls, a treatment planning function, an optimization selection and priority module, and a well monitoring system. The well treatment control system may be operable to take all well site parameters and external factors into consideration and make adjustments to equipment operation to provide an optimized treatment operation.

The FIGURE illustrates a well treatment control system 100. Well treatment control system 100 may include real-time treatment decision engine 102 which may interface with other components of well treatment control system 100. Well monitoring system 106 may be coupled to wellbore 104 to monitor conditions at a surface or downhole in wellbore 104. Some components of well monitoring system 106 may include pressure transducers, flow meters, and densometers for example. Well information monitoring system 106 may transmit collected data to real-time treatment decision engine 102.

Optimization selection and priority module 108 may interface with real-time treatment decision engine 102, treatment planning function 110, and equipment-centric decision engine 112. Optimization selection and priority module 108 may include predictive models that may be referenced to estimate production, estimate well site emissions, estimate risk, estimate economics of a particular operating condition, and combinations thereof. Output from the models may be used to prioritize different treatment operations and estimate the effects of changing a treatment parameter, for example. The models provided may predict total emissions resulting from a change in treatment rate or the risk to a particular piece of equipment associated with a change in treatment rate, for example. In an example, equipment risk of each piece of equipment may be evaluated using the model and based on the output of the model, the equipment that carries an acceptable amount of risk to the treatment operation, either through equipment failure or other risk factors, may be selected. In another example, economic benefits of selecting one piece of equipment over another may be selected. A model may be provided that estimates the equipment cost associated with performing an operation with a particular piece of equipment. The model output may then be used to evaluate if an operation is cost-effective, for example.

Output from optimization selection and priority module 108 may feed into treatment planning function 110. Treatment planning function may include a pump schedule, for example, that may contain a plan for how the wellbore treatment should be performed to create a fracture with specified properties. The pump schedule may include the volume of fluid to be pumped, any additional chemical additives that need to be included in the fracturing fluid, and the type and concentration of proppant, for example. The pump schedule may be modified based on input from optimization selection and priority module 108.

Optimization selection and priority module 108 may also interface with equipment-centric decision engine 112. Equipment-centric decision engine 112 may contain models of equipment and may be able to predict readiness and abilities of equipment at the wellbore servicing location. Equipment-centric decision engine 112 may take as an input commands or actions from real-time treatment decision engine 102 and decide, based at least in part on model, which equipment should perform the requested action. Equipment-centric decision engine 112 may interface with equipment controls 114 to provide a control signal which may be interpreted by equipment controls 114 and translated into equipment action.

The foregoing has broadly outlined well treatment control system 100. Specific methodology will now be discussed with reference to components of well treatment control system 100. A method may include collecting a list of equipment available wellbore servicing location and identifying the equipment's capabilities. The equipment information may be collected from various sources such as including, but not limited to, geotags, component identifiers, communication protocols, and RFID writable tags, for example.

It will be appreciated that field conditions, such as wellsite topology, may dictate a particular rig up of equipment and what equipment may be suitable for a particular application. Each wellbore servicing location may have unique features that require a particular set of equipment to be present. Furthermore, the particular equipment needed to perform certain wellbore operations may depend on the operation being performed. Some wellbore operations may include, without limitation, production enhancement such as hydraulic fracturing, cementing, directional drilling, wireline service, coiled tubing service, hydraulic workover service, measurement while drilling, logging while drilling, and other wellbore operations well known in the art. A total jobsite health status and report may be calculated by summing a readiness level of each piece of equipment. Readiness level may be characterized by conditional capability and operational capability of each piece of equipment. Conditional capability may refer to the performance of a particular piece of equipment given its condition without regards to its rig up and position within the wellbore servicing location. Conditional capability may be related to parameters such as how old or new a particular piece of equipment is, the service history of a particular piece of equipment, previous performance of the equipment, remaining life estimates, among others well known in the art. Conditional capability may answer questions such as, in isolation, how many hours can a pump be driven at maximum hydraulic horsepower load before the pump is expected to encounter a condition where the pump must be brought offline for repair. Conditional capability may also include factors such as planned maintenance on equipment and planned shutdown transitions. Conditional capability may also include measurements and/or determining availability of chemicals, proppant, and other consumables required to perform the wellbore servicing operation.

Operational capability may be the capability of a particular piece of equipment to operate once the rig up is complete and the equipment is ready to being the fracturing operation. Operational capability may be contrasted with conditional capability as conditional capability does not take into account the actual rig up of the equipment. Operational capability of each piece of equipment at the wellbore servicing location may be a function of how each piece of equipment is arranged and physically connected. Operational capability may therefore be much more difficult to predict as there may be a large number of permutations of arrangements, or order, of equipment selected to be brought to a wellbore servicing location as well as a large number of types of rig ups. Operational capability of a particular piece of equipment may not be easily predicted ahead of time as it may be largely dependent upon the physical location of the equipment at the wellbore servicing location. Modeling a particular arrangement and rig up of equipment may not replicate all contributing conditions that determine the operational capability of a particular piece of equipment. As such, operation capability may generally be evaluated in situ when all equipment is connected and operational.

Operational capability may be evaluated by running the wellbore servicing equipment and observing the performance characteristics of the equipment. Wellbore servicing equipment, such as pumps, may be positioned side by side at a wellbore servicing location for maximum space efficiency and for connection to a manifold. The ambient air temperature around a pump may be a function of the far field temperature as well as the temperature rise cause by the positioning of the pump at a wellbore servicing location. As one of ordinary skill in the art would understand, a pump positioned between two other pumps may experience a higher ambient temperature and therefore be operating at a higher temperature than a pump at the end of a line of pumps. The pumps used in hydraulic fracturing are typically trailer mounted positive displacement reciprocating plunger pump powered by an internal combustion engine connected to a transmission. The transmission may have a drive shaft connected to a power end of the pump wherein the power end may transform the rotation of the driveshaft into reciprocating motion required for operating the fluid end of the pump. The fluid end of the pump may include plungers and valves whereby the plungers are reciprocated by the power end of the pump. The internal combustion engine and transmission operating between two other pumps will likely have higher operating temperatures than an engine and transmission operating to either of the middle pump.

During the fracturing operation, the middle pump may become heat soaked from being surrounded by pumps to either side due to a higher ambient temperature experience by the middle pump. Heat soaked pumps will generally perform worse and have a higher rate of failure than pumps which are not heat soaked. As one of ordinary skill in the art will appreciate, the engine controls may try to control engine operation to maximize efficiency, deliver the requested horsepower, and keep the engine operating in a safe condition so that engine damage does not occur. Heat output from the engines operating at a wellbore servicing location may increase the ambient temperature which may lower the air density around a pump. A diesel engine depends on excess oxygen to help cool the combustion while simultaneously increasing the power due to greater gas expansion. Lower air density results in higher temperatures since there is less air to absorb the heat of combustion. The resulting high engine exhaust temperature will cause the engine to reduce the fuel load to reduce exhaust temperatures to prevent damaging the engine from the high temperatures. In either condition, the result may be that the engine controls effectively lower the horsepower output of the engine to compensate for operating conditions. The reduced horsepower output may lead to reduced hydraulic horsepower output by the pump leading to less volumetric flow rate and pressure output.

Additionally, higher ambient temperatures may make the radiators connected to the engine perform worse as the temperature gradient between the ambient air and the engine coolant decreases. In some pumps, the radiator fan speed is a direct function of engine RPM. As the ambient temperature rises, the rate of heat transfer from the radiator may decrease causing heat to build up in the engine. The engine controls may detect an increase in coolant temperature and may compensate by decreasing engine RPM thereby reducing the heat output of the engine which may also cause the radiator fan speed to drop, further reducing heat transfer out of the pump. The reduced RPM will may lead to a lower volumetric flow rate from the pump. Furthermore, heat retention by the coolant may cause other engine fluid such as engine oil to heat up. The hotter oil may decrease in viscosity leading to more engine wear. In extreme cases, hot oil may begin to break down causing a permanent loss in viscosity and lubrication ability. Either condition of engine oil may wear on the engine and pump and potential pre-mature failure of the engine and/or pump components.

Heat soak may also affect the performance of the transmission. The transmission provides speed and torque conversion from the engine driveshaft to the power end of the pump. Transmissions may be a critical component of the pump as the transmission converts the relatively higher RPM and lower torque of the engine crankshaft to a relatively lower RPM and higher torque required by the power end of the pump. Transmissions often rely on transmission fluid to cool and lubricate the transmission components. Pumps typically have a separate radiator for the transmission fluid to exchange heat with the ambient air. Transmissions components may become heat soaked and increase in temperature when inadequate amounts of heat are removed from the transmission fluid. Much like the engine controls, transmission controls may operate to keep the transmission operating in an efficient, safe, and non-damaging manner. If the transmission controls detect that the transmission fluid temperature rises, the controls may make adjustments to the operation of the transmission, such as changing the gear the transmission is in to compensate. The change in gearing may be accompanied by an increase in RPM by the engine controller to compensate for the lower gearing that results in more cooling for the engine and other components that are cooled by an engine driven fan. As discussed above, the horsepower output of the engine may be reduced thereby leading to a reduction in hydraulic horsepower applied to a treatment fluid the pump is pressurizing. Much like engine oil, transmission fluid may become damaged if exposed to high heat and thereafter lose its viscosity and lubrication properties. As such heat soak in transmissions may be a concern to operators.

For at least the foregoing reasons, during the hydraulic fracturing operation, the maximum horsepower available from a particular pump may be a function of ambient temperature which can be a function of placement of pumps. To determine the maximum horsepower output of a particular pump during the hydraulic fracturing treatment, a pump may be run up to maximum horsepower output while the pumps surrounding the pump to be tested are also run up to maximum horsepower. Since pumps to one side of the manifold are more impacted by those pumps on the same side, a subsequent decrease in load, or horsepower, may be applied to pumps on the other side of the manifold to keep the treatment rate constant. Treatment rate may refer to the pressure and flow rate of the treatment fluid, such as a fracturing fluid, from the manifold into the wellbore. In general, the treatment rate is an engineered parameter based on reservoir properties and computer models, among other parameters. The treatment rate may be dictated by a pump schedule whereby the treatment rate is a predetermined value for each stage of the hydraulic fracturing treatment. Using the methods herein, the deviation in treatment rate may be controlled within a specified amount such that the pump schedule is adhered to. In some examples, the deviation from the pump schedule may be less than about 10%. Alternatively, the deviation from the pump schedule may be less than about 5%, less than about 3%, or less than about 1%. The pumps that are run up to maximum horsepower may be kept at maximum horsepower such that the ambient air temperature around the pumps is increased. Performance of the pump to be tested may be monitored throughout over a period of time to observe how the increased ambient temperature affects the horsepower output of the pump. In the instance where the pump to be tested is at the end of the manifold, the pump at the end of the manifold and the pump adjacent to it on the same side of the manifold may be run up to maximum horsepower. It may be observed that as the ambient temperature around a pump increases, the pump performance decreases. The performance of the pump may be recorded by a computer system and stored in an operational database. Some data points that may be stored may include ambient temperature, engine oil temperature, engine coolant temperature, transmission fluid temperature, transmission gear, RPM, horsepower output, pump flow rate, pump pressure, and other performance factors of the pump. The data points may be used later to determine the maximum horsepower at a particular temperature the pump can reliably output in the particular rig up configuration.

Another parameter that may affect operational capability may the availability of a fluid to pump. Availability may refer to multiple parameters including fluid flow rate and pressure to sustain the flow rate requirement of the pump. As discussed above, most pumps used in hydraulic fracturing are plunger driven fixed displacement pumps and therefore a full rotation of the pump displaces a fixed volume of fluid. As such the volumetric flow rate of the pump is proportional to the RPM the pump is driven at. When a pump is not provided with adequate volumetric rate of fluid to pump, cavitation may occur. For example, if a pump displaces 100 gallons per minute at a particular RPM, there must be at least 100 gallons per minute of flow to the pump or cavitation may occur. Pumps may be starved of flow for many different reasons only some of which may be discussed herein. In one instance, the blender may not be providing adequate pressure to sustain the demand from the operator on the pumps. The pumps may be running at an RPM that is too high, and by extension at too great of a flow rate, for the blender or blenders to support. Another condition where a pump does not receive adequate inlet flow may be where a pump is positioned on a manifold furthest from the blender. Each of the pumps upstream of the end pump may be suctioning the inlet flow before the fluid can reach the end pump thereby leading to a pressure starvation condition. Pumps may also be starved of inlet flow by rig up conditions such as hoses and conduits that are too long that drop too much pressure or hoses and conduits that are too small and can't deliver the requested flow rate.

Another parameter that may affect operational capability may be related to the operating nature of reciprocating pumps. As one of ordinary skill in the art will appreciate, the reciprocating nature of a positive displacement plunger-pump will cause a pulsing flow on both the inlet and the outlet of the pump. For some examples of reciprocating plunger pumps, a connecting rod may connect the plunger to a crankshaft in the power end of the pump. As such, the plunger velocity versus crank angle of a reciprocating plunger pump may be a function of interactions between the connecting rod and crankshaft. As most connecting rods are relatively short, the interaction between the crankshaft and connecting rod tend to produce highly distorted sinusoidal flow curves. The distorted flow curves may have several effects on pump flow including high peak flow rates and associated pressure drop due to high flow rates affecting net positive suction head and possibly inducing cavitation. The distorted sinusoid may begin to stack on top of one another when multiple pumps on the same manifold in close proximity are operated. When the sinusoids of pumps overlap, "beats" or areas of alternating constructive and destructive interference may occur. When sinusoids coincide on an inlet stroke forming constructive interference, for example, the total inlet flow rate required to sustain a non-cavitation condition in the pump may exceed what is possible by the particular rig up. As such, the total inlet flow required to sustain the pump at the particular RPM may not be satisfied and cavitation may occur. Similarly, when sinusoids coincide on the power or outlet stroke forming constructive interference, large pressure spikes may occur in the pumping equipment which may lead to equipment damage or loss of pressure containment.

One method to determine operational capability of a pump relating to availability of fluid may be to select one or more pumps and vary the flow rate of each pump while keeping the total treatment volume fixed as previously discussed. The pump or pumps may be ramped up and down through a maximum flow rate to observe cavitation tendencies and tendencies to form beats in the inlet and outlet flows of the pumps. Again, the pumps on one side of a manifold may be more affected by pumps on the same side of the manifold. As such, the flow rates of the pumps on the opposite side of the manifold from the pump or pumps being tested may be ramped up or down such that the treatment rate remains relatively constant. The data points collected may include but are not limited to RPM of pumps, flow rate, cavitation tendencies, beat tendencies, and other parameters well known in the art. The data points may be collected and stored in an operational database as previously described. The operational database, and the data therein, may be used to form a model that may predict flow behavior of the pump. The model may be used to adjust one or more operating parameters of the pump, for example. One operating parameter of interest may be the rate available from a particular pump. During a hydraulic fracturing operation additional treatment rate may be required over the planned rate according to the pump schedule. The model may be used to determine which pumps can handle the additional rate. In another application, if a pump has a mechanical failure or stops functioning properly, the model may be used to assess which pumps the rate may be redistributed to. In another example, the model may be used to evaluate stand-by equipment that is not currently participating in the pumping of the hydraulic fracturing fluid.

Another parameter that may affect operational capability may be related to the manifold and discharge lines. The manifold and discharge lines may have a natural frequency or frequencies that the equipment may vibrate or oscillate at. Frequency and location of where oscillations may occur may be a function of pump type, flow rate, discharge pressure, and fluid density, for example. Much like beats may cause pressure spikes and equipment damage, mechanical oscillations within the manifold and discharge lines may cause equipment damage.

One method to determine operational capability of a manifold and discharge lines may be to select one or more pumps and vary the flow rate, discharge pressure, and fluid density of the fracturing fluid. The pump or pumps may be ramped up and down through a minimum flow rate through a maximum flow rate as well and minimum pressure to maximum pressure to observe mechanical resonances in the equipment. The blender may be operated to provide a variable density fluid by adding more or less proppant to the fracturing fluid. The operational parameters of pumps on either side of a manifold may be varied such that mechanical resonances may be induced. The data points collected may include but are not limited to RPM of pumps, flow rate, density and other parameters well known in the art. The data points may be collected and stored in an operational database as previously described. The operational database, and the data therein, may be used to form a model that may predict mechanical resonance behavior of the discharge lines and manifold for the particular rig up. The model may then be used to adjust one or more operating parameters of the pumps and blender to avoid conditions that excite mechanical vibrations, for example. The mechanical vibrations can be monitored with accelerometers or other suitable sensors.

Blenders may also be evaluated using similar methods. A blender may include an engine that may directly or indirectly drive auxiliary equipment such as augers, sand screws, valves, centrifugal pumps, dry additive handling equipment, and other auxiliary equipment of fracturing blenders. As with pumps and other wellbore servicing equipment, the engine of a blender may become heat soaked due to the ambient temperature increasing. The blender may be ramped up and down through a maximum flow rate by, for example, providing maximum power to centrifugal pumps and observing the response. Some observed responses may include cavitation tendency, pump flow rate, pump temperature, RPM, beat tendencies and other responses. The data points may be collected and stored in an operational database as previously described. The operational database, and the data therein, may be used to form a model that may predict flow behavior of the blender. The model may be used to adjust one or more operating parameters of the blender, for example. Some operating parameters of interest may be the pressure available from the blender, concentration of proppant capable of being pumped, concentration of chemical additives available to be pumped, and other parameters of the blender. During a hydraulic fracturing operation additional treatment rate may be required over the planned rate according to the pump schedule. The model may be used to determine if the blender can handle the adjusted rate and which operating parameters are needed to be adjusted to achieve the required rate, for example.

The equipment centric decision engine described in the FIGURE may interface with the real-time treatment decision engine to receive commands. Commands may include any instruction to perform an operation. In an example, the command may include requesting additional flow rate. The equipment centric decision may interface with the operational database and models contained therein to determine which equipment is best suited to handle the additional flow rate and determine how the equipment should be operated to avoid mechanical resonance and beats. The equipment centric decision engine may then interface with the equipment controls on each piece of equipment to provide a control signal based on the model. The equipment centric decision engine may also be configured to select whether the equipment controls operate in an open or closed loop configuration and whether the control style is observer based, feed forward, or PID. The control style may be selected based on readiness level, for example. A physics based model may be required to predict where the readiness level is. The physics based model may include at least one of the following model types, deterministic, neural net, deep neural net, machine learning, genetic neural net, mortality prediction model, review of systems model, review of systems algorithm model, and combinations thereof. Block chain technology may be implemented to distribute computation of the model, enable parallel computation, and ensure protection of data.

The systems and methods may include any of the various features of the systems and methods disclosed herein, including one or more of the following statements.

Statement 1. A method of performing a wellbore operation may include providing a real-time treatment decision engine, equipment centric decision engine, and equipment controls. The equipment centric decision engine may be configured to interface with the real-time treatment decision engine and the equipment controls. The equipment centric decision may include an operational database including wellbore servicing equipment models. The method may further include providing wellbore servicing equipment. The wellbore servicing equipment may be operable to be controlled by the equipment controls. The method may further include sending a command from the real-time treatment decision engine to the equipment centric decision engine. The method may further include evaluating the command using the wellbore servicing equipment models. The method may further include selecting equipment to carry out the command based at least in part on the wellbore servicing equipment models. The method may further include sending a control signal to the equipment controls.

Statement 2. The method of statement 1 wherein the wellbore servicing equipment includes fracturing equipment, cementing equipment, directional drilling equipment, measurement while drilling equipment, logging while drilling equipment, wireline service equipment, coiled tubing equipment, hydraulic workover equipment, and combinations thereof.

Statement 3. The method of statement 1 or statement 2 wherein the step of evaluating the command using the wellbore servicing equipment models includes calculating a readiness level of the wellbore servicing equipment.

Statement 4. The method of statement 3 wherein the readiness level is a sum of conditional capability of the wellbore servicing equipment and operational capability of the wellbore servicing equipment.

Statement 5. The method of statement 4 wherein the conditional capability of the of the wellbore servicing equipment includes at least one of measurements and/or determining availability of chemicals, proppant, and other consumables available to the wellbore servicing equipment, assessed current condition of the wellbore servicing equipment, planned maintenance for the wellbore servicing equipment, performance history of the wellbore servicing equipment, or planned shutdown transitions of the wellbore servicing equipment.

Statement 6. The method of statement 4 or statement 5 wherein the operational capability of the wellbore servicing equipment is determined by varying a plurality of operational parameters of wellbore servicing equipment.

Statement 7. The method of statement any one of statements 1 to 6 wherein the operational capability of the wellbore servicing equipment is determined by: varying a plurality of operational parameters of wellbore servicing equipment; observing a response of the wellbore servicing equipment; recording the response in the operational database; and modeling the operational capability based at least in part on the response.

Statement 8. The method of statement 7 wherein the plurality of operational parameters include RPM, rate, pressure, density, or a combination thereof.

Statement 9. The method of statement 7 or statement 8 wherein the response includes a response to ambient temperature change, oil temperature change, transmission fluid temperature change, fluid density change, fluid rate change, fluid pressure change, or a combination thereof.

Statement 10. The method of any one of statements 7 to 9 wherein observing the response includes observing a temperature dependent response of pump horsepower.

Statement 11. The method of any one of statements 7 to 10 wherein observing the response includes observing a rate dependent response on cavitation.

Statement 12. The method of any one of statements 7 to 11 wherein observing the response includes observing a rate dependent response on mechanical resonances.

Statement 13. The method of statement 4 wherein the step of calculating a readiness level includes a physics based model selected from the group consisting of a deterministic model, a neural net model, a deep neural net model with two or more hidden layers, a machine learning model, a mortality prediction model, a review of systems model, a review of systems algorithm model, or combinations thereof.

Statement 14. The method of statement 4 wherein the step of calculating a readiness level includes using a block chain to distribute computation, enable parallel computing, and/or protect data.

Statement 15. A system may include wellbore servicing equipment and a wellbore treatment control system. The wellbore treatment control system may include a real-time treatment decision engine, an equipment centric decision engine, and equipment controls. The equipment centric decision engine may be configured to interface with the real-time treatment decision engine and the equipment controls. The equipment centric decision may include an operational database including wellbore servicing equipment models. The operational database may include historical data points of operational parameters and operational data of the wellbore servicing equipment. The wellbore servicing equipment models may be based at least in part on the historical data points of operational parameters and operational data of the wellbore servicing equipment.

Statement 16. The system of statement 15 wherein the wellbore treatment control system is configured to adjust operational parameters of the wellbore servicing equipment and record collected operational data in the operational database.

Statement 17. The system of statement 15 or statement 16 wherein the wellbore treatment control system is configured to: adjust an operating parameter of at least one component of the wellbore servicing equipment; measure operational data related to the adjustment; and record the collected operational data in the operational database.

Statement 18. The system of any one of statements 15 to 17 wherein the wellbore treatment control system is configured to adjust operational parameters of the wellbore servicing equipment based at least in part on the wellbore servicing equipment models.

Statement 19. The system of any one of statements 15 to 18 wherein the wellbore treatment control system is configured to adjust operational parameters of the wellbore servicing equipment such that at least one selectable objective is met.

Statement 20. The system of statement 19 wherein the selectable objective includes well productivity, reservoir productivity, equipment expense, sound emissions, air emissions, fuel consumption, treatment pressure, or combinations thereof.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in the present disclosure and one or more patent(s) or other documents that may be incorporated herein by reference, the definitions that are consistent with the present disclosure should be adopted.

What is claimed is:

1. A method of performing a wellbore operation comprising:
   providing a real-time treatment decision engine, equipment centric decision engine, and equipment controls, wherein the equipment centric decision engine is configured to interface with the real-time treatment decision engine and the equipment controls, and wherein the equipment centric decision comprises an operational database comprising wellbore servicing equipment models;
   providing wellbore servicing equipment, wherein the wellbore servicing equipment is operable to be controlled by the equipment controls;
   sending a command from the real-time treatment decision engine to the equipment centric decision engine;
   evaluating the command using the wellbore servicing equipment models wherein the step of evaluating the command using the wellbore servicing equipment models comprises calculating a readiness level of the wellbore servicing equipment, wherein the readiness level is a sum of conditional capability of the wellbore servicing equipment and operational capability of the wellbore servicing equipment;
selecting wellbore servicing equipment to carry out the command based at least in part on the calculated readiness level of the wellbore servicing equipment; and
sending a control signal to the equipment controls associated with the selected wellbore servicing equipment to cause the selected wellbore servicing equipment to carry out the command.

2. The method of claim 1 wherein the wellbore servicing equipment comprises fracturing equipment, cementing equipment, directional drilling equipment, measurement while drilling equipment, logging while drilling equipment, wireline service equipment, coiled tubing equipment, hydraulic workover equipment, and combinations thereof.

3. The method of claim 1 wherein the conditional capability of the of the wellbore servicing equipment comprises at least one of measurements and/or determining availability of chemicals, proppant, and other consumables available to the wellbore servicing equipment, assessed current condition of the wellbore servicing equipment, planned maintenance for the wellbore servicing equipment, performance history of the wellbore servicing equipment, or planned shutdown transitions of the wellbore servicing equipment.

4. The method of claim 1 wherein the operational capability of the wellbore servicing equipment is determined by varying a plurality of operational parameters of wellbore servicing equipment.

5. The method of claim 1 wherein the operational capability of the wellbore servicing equipment is determined by:
varying a plurality of operational parameters of wellbore servicing equipment;
observing a response of the wellbore servicing equipment;
recording the response in the operational database; and
modeling the operational capability based at least in part on the response.

6. The method of claim 5 wherein the plurality of operational parameters comprise RPM, rate, pressure, density, or a combination thereof.

7. The method of claim 5 wherein the response comprises a response to ambient temperature change, oil temperature change, transmission fluid temperature change, fluid density change, fluid rate change, fluid pressure change, or a combination thereof.

8. The method of claim 5 wherein observing the response comprises observing a temperature dependent response of pump horsepower.

9. The method of claim 5 wherein observing the response comprises observing a rate dependent response on cavitation.

10. The method of claim 5 wherein observing the response comprises observing a rate dependent response on mechanical resonances.

11. The method of claim 1 wherein the step of calculating a readiness level comprises a physics based model selected from the group consisting of a deterministic model, a neural net model, a deep neural net model with two or more hidden layers, a machine learning model, a mortality prediction model, a review of systems model, a review of systems algorithm model, or combinations thereof.

12. The method of claim 1 wherein the step of calculating a readiness level comprises using a block chain to distribute computation, enable parallel computing, and/or protect data.

13. A system comprising:
wellbore servicing equipment; and
a wellbore treatment control system comprising:
a real-time treatment decision engine,
an equipment centric decision engine, and
equipment controls,
wherein the equipment centric decision engine is configured to interface with the real-time treatment decision engine and the equipment controls,
wherein the equipment centric decision comprises an operational database comprising wellbore servicing equipment models,
wherein the operational database comprises historical data points of operational parameters and operational data of the wellbore servicing equipment,
wherein the wellbore servicing equipment models are based at least in part on the historical data points of operational parameters and operational data of the wellbore servicing equipment,
wherein the wellbore servicing equipment is operable to be controlled by the equipment controls,
wherein the real-time treatment decision engine is configured to send a command to the equipment centric decision engine and,
wherein the equipment centric decision engine is configured to:
evaluate the command using the wellbore servicing equipment models by calculating a readiness level of the wellbore servicing equipment, wherein the readiness level is a sum of conditional capability of the wellbore servicing equipment and operational capability of the wellbore servicing equipment,
select wellbore servicing equipment to carry out the command based at least in part on the readiness level of the wellbore servicing equipment; and
send a control signal to the equipment controls to carry out the command.

14. The system of claim 13 wherein the wellbore treatment control system is configured to adjust operational parameters of the wellbore servicing equipment and record collected operational data in the operational database.

15. The system of claim 13 wherein the wellbore treatment control system is configured to:
adjust an operating parameter of at least one component of the wellbore servicing equipment;
measure operational data related to the adjustment; and
record the collected operational data in the operational database.

16. The system of claim 13 wherein the wellbore treatment control system is configured to adjust operational parameters of the wellbore servicing equipment based at least in part on the wellbore servicing equipment models.

17. The system of claim 13 wherein the wellbore treatment control system is configured to adjust operational parameters of the wellbore servicing equipment such that at least one selectable objective is met.

18. The system of claim 17 wherein the selectable objective comprises well productivity, reservoir productivity, equipment expense, sound emissions, air emissions, fuel consumption, treatment pressure, or combinations thereof.

* * * * *